United States Patent [19]

Valeri et al.

[11] Patent Number: 4,813,012

[45] Date of Patent: Mar. 14, 1989

[54] TERMINAL ACCESS PROTOCOL CIRCUIT FOR OPTICAL FIBER STAR NETWORK

[75] Inventors: Marco Valeri; Carlo A. Rocchini, both of Rome, Italy

[73] Assignee: Alcatel N. V., Stuttgart, Fed. Rep. of Germany

[21] Appl. No.: 80,411

[22] Filed: Jul. 30, 1987

[30] Foreign Application Priority Data

Jul. 30, 1986 [IT] Italy .................. 21310 A/86

[51] Int. Cl.⁴ .................. G06F 13/12; H04J 3/02
[52] U.S. Cl. .................. 364/900; 364/200; 340/825.5; 340/815.31; 455/606; 455/607; 455/618; 455/619
[58] Field of Search ... 364/200 MS File, 900 MS File; 340/815.31, 825.5; 455/606, 607, 618, 619; 178/69 N

[56] References Cited

U.S. PATENT DOCUMENTS

| | | | |
|---|---|---|---|
| 4,222,116 | 9/1980 | Groves | 375/55 |
| 4,346,452 | 8/1982 | Groves | 364/900 |
| 4,511,208 | 4/1985 | Ozeki et al. | 350/96.16 |
| 4,531,239 | 7/1985 | Usui | 455/607 |
| 4,584,678 | 4/1986 | Ozeki et al. | 370/85 |
| 4,630,254 | 12/1986 | Tseng | 370/1 |
| 4,641,371 | 2/1987 | Shutterly | 455/601 |
| 4,654,889 | 3/1987 | Shutterly | 455/601 |
| 4,701,909 | 10/1987 | Kavehrad et al. | 370/85 |
| 4,712,859 | 12/1987 | Albanese et al. | 350/96.16 |
| 4,716,408 | 12/1987 | O'Connor et al. | 340/825.5 |

Primary Examiner—Raulfe B. Zache
Assistant Examiner—Danh Phung
Attorney, Agent, or Firm—Christie, Parker & Hale

[57] ABSTRACT

A queue state access protocol device for serial exchange of numerical information among terminals interconnected by an optical fiber star network, transmits queue state data over a small fraction of the network's total information channel capacity. A circuit measures the distance from each terminal to the star center and allows the terminals to synchronize their respective queue state transmissions, thereby minimizing the physical occupation of transmission channels. The delay queue for accessing the network is managed by a microprocessor which is provided in each terminal of the network.

5 Claims, 2 Drawing Sheets

TERMINAL ACCESS PROTOCOL CIRCUIT FOR OPTICAL FIBER STAR NETWORK

TECHNICAL FIELD

The present invention relates to a circuit device for implementing the access protocol for serial exchange of numerical information among terminals interconnected by an optical fiber star network, preferably usable in Local Area Networks (LAN) for voice and data transmission.

BACKGROUND ART

Optical telecommunications utilize optical guides, called optical fibers because of their fiber-like structure, which can be used to create networks of varying degrees of complexity by connecting a plurality of user terminals.

If all network terminals are connected to a common central node, the network is called a star network.

The central node can be either active (signal repeater or switching network) or passive (optical signal coupler). In either case, the network's terminals can exchange numerical information in the form of coded pulse sequences, in serial fashion, with pulses of any sequence being transmitted one after the other in packets, in accordance with a predetermined access protocol.

Desirable requirements for a network access protocol to be used by terminals operating in real-time are:
 (a) efficiency independent of the transmission speed of the coded pulse packets;
 (b) efficiency independent of both static transmission characteristics and traffic distribution;
 (c) distribution of packet transmission delays within a small value range;
 (d) ability to tolerate different distributions of such delay for different user classes;
 (e) provision for communication with other networks.

In accordance with the current state of the art, the above requirements may be met with network access protocols based on possible conflict prevention techniques, using an optical fiber star network.

A first typical example is the CSMA-CD (Carrier Sense Multiple Access with Collision Detection) technique. With this technique, a terminal sends a message immediately after having ascertained that the channel is clear. To this end, the received signal level is continuously monitored in order to detect possible collisions among simultaneously transmitted messages, since, if that has occurred, there will be a detectable change in the received signal level. After a collision is detected, each of the terminals involved stops any transmission then in process and, after the channel is clear, it commences retransmission in a way that is not likely to cause as second collision, for example, only after a random period of time has elapsed.

With an access protocol of this type, the greatest efficiency is achieved if the individual transmission intervals, and therefore the individual code pulse packets, are relatively long and if the signal propagation time among terminal pairs of the same network (propagation delay) is relatively short. This is inconsistent with very high transmission speeds since the packet transmission time becomes shorter and shorter with respect to signal propagation time.

An alternate conflict prevention technique for network access protocols will now be described which overcomes this latter difficulty. In this alternate technique each terminal transmits its own queue state data, so that each terminal has access to information regarding the position of all network users in a network-wide delay queue. This allows the automatic allocation of message transmission times for each terminal in accordance with a network delay queue collision avoidance algorithm, ensuring an optimal channel utilization efficiency which is independent of distribution and traffic characteristics.

That solution, however, has the drawback of requiring a terminal queue state data transmission protocol which itself is subject to the very disadvantages which it aims to eliminate—inefficient use of transmission capacity due to propagation time effects.

SUMMARY OF INVENTION

The object of the present invention is to overcome the above-mentioned drawbacks as regards circuits currently in use, by carrying out and providing a circuit for implementing an access protocol for serial exchange of numerical information among terminals interconnected by an optical fiber star network, which allows the serial exchange of information among terminals in a manner which is entirely asynchronous and independent of transmission speed, of transmission delay distribution and of traffic and transmission characteristics distribution.

This and other objects, which will be better understood from the following description, are met by the hereinafter disclosed terminal access protocol circuit, which implements an efficient access protocol for serial exchange of numerical information among terminals interconnected by an optical fiber star network.

In accordance with a presently preferred embodiment thereof, a network terminal includes a microcomputer which is provided with a Random Access Memory to buffer queue states and messages, as well as with a Read Only Memory, for storing the physical addresses of all terminals. Initially, the microcomputer controls a distance measuring circuit for measuring each terminal's distance from the network's star center, beginning from the terminal nearest to the center. Concurrently with the transmission of a driver pulse from the terminal closest to the star center, which is used to synchronize the respective oscillators in each of the terminals, each terminal initiates the operation of its start-of-transmission counter. The end-of-count output from the start-of-transmission counter sets a flip-flop, which enables clock pulses to a bit counter, a parallel-to-series converter shift register and an NRZ to Manchester encoder. By means of these circuit elements, the individual terminal's queue state data bits are lined up, counted, and coded in Manchester format for transmission. A second counter counts the received queue state data from all of the terminals, the output of the counter being used to address the external RAM which buffers the queue state data when it is received. When the second counter indicates the end of reception of the queue state data, the data may then be read into the microcomputer's internal data memory, whereupon the entire circuit begins a new transmission-reception cycle.

BRIEF DESCRIPTION OF DRAWINGS

Further characteristics and advantages of the present invention will become more apparent form the follow

DETAILED DESCRIPTION OF THE INVENTION

Figure 1A:
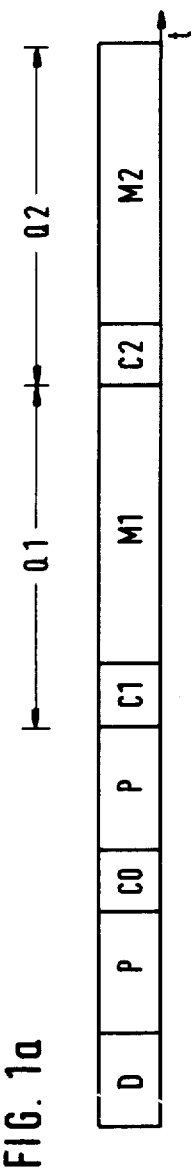
- FIGS. 1a-1c are timing diagrams showing the steps of terminal access to the network.

At the outset it is noted that the following description for the most part specifically concerns the queue state reception and transmission aspect of the invention (which, from the perspective of understanding and using the present invention, is the most important aspect thereof); the transmission and reception of data messages is more briefly described. Without limiting the invention thereto, it is noted that the transmission of data messages may be patterned after the transmission of queue state data, requiring the possible addition of sufficient memory in accordance with the size and format of the individual packets coded pulses which comprise the information messages.

It is also noted that although the principles of the present invention are applicable to any number of terminals, optical cable length, data packet format and transmission speed, the following description relates to an exemplary optical star network which interconnects a maximum of 64 terminals, which transfers messages at 140 Mbit/sec, and which uses a 5-bit code for each individual terminal's queue state.

Before further circuit details are discussed, a few preliminary remarks are in order.

In a star network, the only resource common to all terminals is the star center which is shared by the other network nodes (terminals) in time-division fashion. In the example contemplated herein, pulse coded light of a given wavelength is transmitted via optical fibers which are interconnected in a star configuration by means of a single center node.

Therefore, after a message sent by a terminal has passed through the star center node, the star center node, and thus the network, is available for switching another message.

Accordingly, the transmission management of queue state data from the individual terminals can be made in a simple and automatic manner provided merely that each terminal knows its own distance from the star center and thus the delay time from the terminal to the star center. This can be achieved by providing each terminal with a novel control circuit for entering the network according to the following protocol:

During an initialization phase, each terminal measures its distance from the star center by transmitting a suitable signal. In order to avoid collisions, and thus an incorrect measure, each terminal transmits in sequence according to its own physical address.

Once the time for a signal transmitted from the terminal to reach the star center has been determined, it is possible to establish a transmission sequence of individual queue states and to synchronize the transmissions so that they pass through the star center in an uninterrupted flow.

Likewise, knowing the delay time required to reach the star center, a terminal which has to transmit an information packet so that it arrives at the star center at a designated time, can advance the time it starts the transmission by a sufficient amount (i.e., the known delay time) so as to minimize the transit time through the star center for several consecutive packets of information.

Reference should now be made to FIG. 1, which shows schematically how the terminals access the network. During the initialization phase (FIG. 1a), the following signals are employed:

Measuring signals for measuring the distance to the star center are first sent (interval D).

A driver message P is then transmitted by one of the terminals, preferably the terminal closest to the star center, in order to synchronize the queue state transmission from all terminals once each terminal has performed the required distance measurement.

Each terminal then transmits its respective queue state data in sequential time-division fashion, during interval CO.

The terminal closest to the star center transmits a driver message once again, in order to give each terminal's queue algorithm circuit sufficient time to determine a current network transmission queue sequence from the received queue state data from the individual terminals and to maintain synchronism with the network.

At this point, during time interval M1, the terminals commence the time-division transmission of individual pulse coded packets of information messages, according to the network transmission queue sequence newly determined from the queue state data received during interval CO.

A third sequence of queue state data C2 is then transmitted, followed by a second time-division transmission of individual pulse coded packets of information message in a sequence determined from the queue state data received during interval C1, and so on.

Figure 1B:
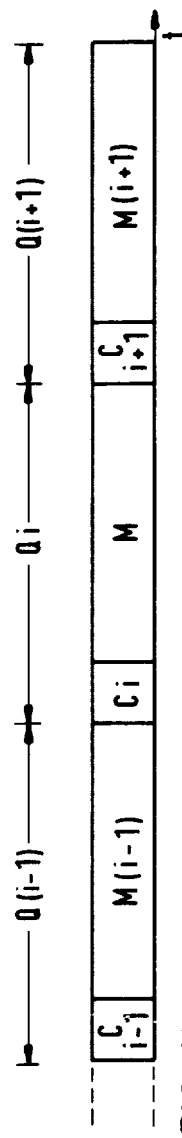
Figure 1C:
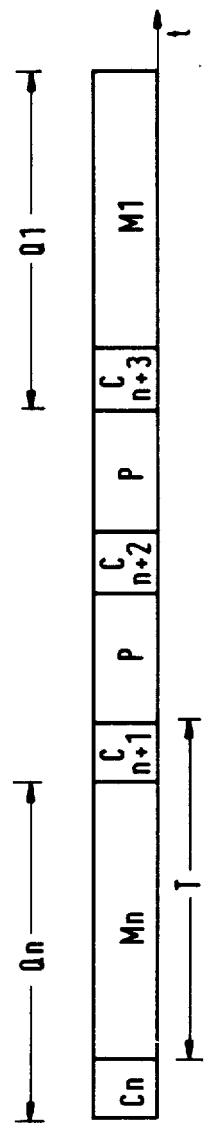

Thus, when the initialization phase is ended, frame sequences $Q_i$ follow on the network, each comprising a sequential transmission of queue state data, during time interval $C_i$, and of packets of pulse coded information messages, during time interval $M_i$ (FIG. 1b).

The queue state data from all terminals is updated at each frame $Q_i$ and the queue algorithm circuit determines the transmission queue sequence to be used in frame $Q_i$ for transmitting the individual packets of information messages according to the queue state data received in a previous frame $Q(i-1)$.

Within a time interval $C_i$, queue state data is time-division transmitted for all active network terminals. Even if a terminal is not active, it still has its assigned time slot in $C_i$. This facilitates both access to the network by an existing terminal not presently active and growth of the system. In that regard, when a new terminal is connected to the network, or when the location of a terminal is altered, changing its distance from the star center, the above-described initialization phase takes place again with a new measurement of distances between terminals and the star center. Distance values are stored in a nonvolatile storage associated with the microcomputer at each terminal. Therefore, if a terminal is activated when other terminals are already active, it can immediately transmit its own queue state data in its assigned temporal channel, synchronizing its own oscillator with the received signals, and then, once it has transmitted its queue state data, it can commence transmission, of information message packets in a subsequent frame $Q(i+1)$.

Each terminal transmits queue state data containing information on the type of message to be transmitted and its priority. Terminals transmit in an order determined from such information by the aforementioned network delay queue collision avoidance algorithm, in a fully asynchronous manner; it is even possible for transmissions from the same terminal to occupy several time slots of information transmission interval Mi within a single frame Qi.

In any case, in order to ensure a separation among subsequent information packets, adjacent temporal channels are separated by a time interval having a period of at least three code pulses. Information packets are switched between the terminals under the control of a network delay queue algorithm which optimally allocates the transmission delay in accordance with the type of message to be transmitted. At each frame, priorities may be updated, taking into account transmission delays.

If, after a transmission cycle, no messages are to be transmitted, the last terminal to transmit sends a driver message, as in the initialization phase (FIG. 1c), in order to allow synchronization to be maintained and another transmission cycle to commence.

Figure 2:
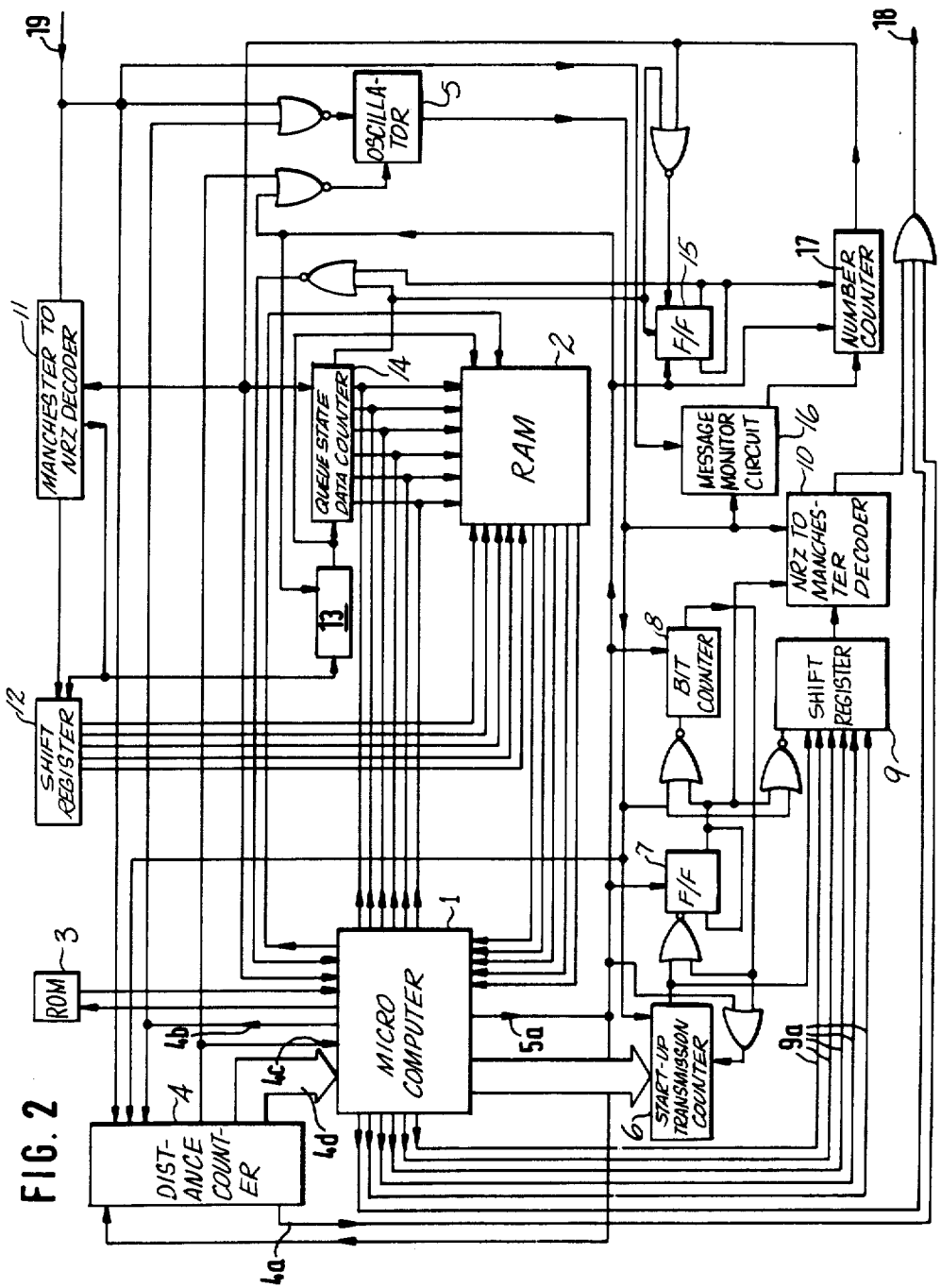
FIG. 2 is a schematic diagram of a presently preferred embodiment of a terminal access protocol circuit according to the present invention.

Referring now to FIG. 2, transmission and reception are controlled by a microcomputer 1, which processes distance measurement and queue state data, and controls and synchronizes the various phases of the access circuit operation.

Most of the logic circuitry external to the microcomputer 1 works at high speed (140 Mbit/sec) and therefore it is necessary to provide an interface between the microcomputer and the external logic in the form of a random access memory (RAM) 2 for buffering the queue states and messages.

The circuit also includes a read only memory (ROM) 3, in which the physical address of all the terminals are stored. In the initialization phase, each terminal's microcomputer 1 causes its respective distance measurement circuit counter 4 to measure the distance between the network's star center and that particular terminal, in accordance with a sequence determined by the physical terminal addresses stored in ROM 3.

At the end of the initialization phase, each terminal transmits the value of its distance to the network's star center to all the other terminals. The active terminal which is nearest to the star center then enables its own oscillator 5 to generate a clock signal at 140 Mbit/sec, sending a driver message 4a to all other active terminals to synchronize their respective oscillators 5. Concurrently, each terminal's microcomputer 1 resets a start-of-transmission counter 6 to an initial value dependent on the distance between the terminal and the star center, counter 6 being used to establish the time offset between the reception of the start of a driver message by the terminal and the transmission of the start of the terminal's own queue state data. The latter consists of 5 code-bits (9a) which are generated by the microcomputer 1 and which contain information about the type of message packets to be transmitted and their transmission priorities.

The end-of-count output from the start-of-transmission counter 6 sets a flip-flop 7, which enables clock pulses to a bit counter 8, a parallel-to-series converter shift register 9 and an NRZ to Manchester encoder 10. By means of these circuit elements, the individual queue state bits in register 9 are lined up, counted and coded in Manchester format for transmission.

The end-of-count output from the bit counter 8 indicates that the queue state data has been transmitted and resets the flip-flop 7 thereby effectively disabling the above-described transmission circuits.

The above-mentioned initialization phase distance measuring operation is effected by the distance counter 4 which, when enabled by a begin-count pulse 4b, receives clock pulses synchronized with the 140 Mbit/sec transmission clock signal; it thus can measure the elapsed time until an echo of the very signal transmitted by the that terminal is sent back from the star center and received by the terminal, by counting the number of clock signal periods.

At 140 Mbit/sec, one such clock period amounts to 7 nsec and if, for example, the propagation delay, corresponding to the maximum terminal-node distance, is 5000 nsec, the number of periods to be counted is at most $5000/7 = 714$ and, thus, in this case, it is sufficient to use a modulo 1024 counter. The first positive edge of the echo signal received by distance counter 4 stops it from further counting and causes an end-of-counting signal 4c to be sent from circuit 4 to microcomputer 1, which can then fetch the distance measuring code 4d.

This delay measurement has an accuracy that is roughly equal to one period of the clock signal; thus, it is necessary include a guard time interval between the individual terminals' transmissions of their respective queue state data of at least three code pulses, in order to avoid any possible interference.

The circuit for receiving the queue state data is the same as that employed for receiving information messages and, thus, is dimensioned according to the packet format of the code pulses forming the messages; in the following, the reception and decoding of the queue state data from all the terminals will be specifically described.

During the initialization phase, after a terminal has transmitted its own distance measurement signal (within time interval D of FIG. 1a), the terminal's microcomputer sends the circuit a reset signal 5a enabling it to receive a driver message 4a, transmitted by the active terminal closest to the star center, the driver message being used to synchronize the terminal's 140 Mbit/sec clock signal oscillator 5 at 140 Mbit/sec with the corresponding oscillators of all other terminals.

At this point, each terminal receives the first sequence CO of queue state data from all active terminals followed by a repetition of the driver message 4a from the active terminal closest the star center, during which the microcomputer queue algorithm processes the queue state data.

The acquisition of the queue state data takes place as follows: the received code pulses comprising queue state data from the various terminals are decoded from manchester-to NRZ-code in the decoder 11 and output to a series-parallel converter shift register 12 and concurrently to a code pulse counter 13 which, every 5 pulses, generates an end-of-count pulse which increments a queue state data sequence counter 14, whose outputs address the RAM 2, thereby storing the queue state data from all the active terminals (no more than 64 terminals in the illustrative example described herein).

Once all of the queue state data from all of the active terminals have been stored in RAM 2, the queue state data sequence counter 14 sends an end-of-count pulse to microcomputer 1 which then enables read access to the data stored in RAM 2.

The same end-of-count pulse from queue state data sequence counter 14 triggers the flip-flop 15 whose output:

signals to microcomputer 1 the reception of all the queue state data, from which the microprocessor can then determine at what point in the upcoming network message transmission cycle it should enable message transmission by the terminal;

enables an output signal from message monitor circuit 16 to message number counter 17 which generates a last message received the end-of-message pulse transmitted to microcomputer, which resets the entire circuit for a new transmission 18 and reception 19 cycle.

It will thus be appreciated that the above mentioned objects have been attained in the above-described a circuit, and that using such a circuit it is possible to exchange information among terminals of a star network in an efficient, asynchronous manner regardless of the particular transmission parameters.

The present invention has been described above with regard to the structure, function and use of a presently contemplated specific embodiment of the invention. It should be appreciated by those skilled in the art that many modifications and variations are possible. Accordingly the exclusive rights afforded hereby should be broadly construed, limited only by the spirit and scope of the appended claims.

What is claimed is:

1. In each of a plurality of terminals interconnected by an optical fiber star network for serial exchanges of information among said terminals through a star center, an access protocol circuit comprising:

a random access memory for buffering received information comprising queue state data from all said terminals;

processing means responsive to the buffered queue state data for determining when said each terminal can transmit information through said star center without interfering with the transmission of information from any other of said terminals;

a read only memory for storing the physical addresses of all said terminals;

measuring means responsive to said processing means for measuring the distance from the star center to said each terminal, said measuring means comprising:

driver message means comprising an oscillator for transmitting a driver message to said star center and for receiving a corresponding echo therefrom and for generating a regular sequence of clock pulses;

means for activating said driver message means in a predetermined time sequence relative to the activation of the driver means in the other terminals of said network, in accordance with the physical terminal addresses stored in said ROM, the driver means in the terminal nearest to the network star center being the first to be so activated;

delay counting means for counting said clock pulses from the time said driver message means is activated until the time said echo signal is received to thereby generate a delay count corresponding to the distance from the terminal to the star center, and means for storing said delay count;

output register means for storing a queue state data word output from said processing means;

transmission delay counting means responsive to the stored delay count for generating a start-of-transmission pulse at a time when the terminal should commence transmitting information so that it will arrive at said star center at the time determined by said processing means; and transmission means for transmitting the queue state data stored in said output register means in response to an end of count pulse from said transmission delay counting means.

2. The access protocol circuit of claim 1, wherein said transmission means comprises:

a bit counter;

a parallel-to-series converter shift register, and an NRZ to Manchester encoder.

3. The access protocol circuit of claim 2, further comprising:

receiver means for receiving said queue state data and for storing it in one or more addresses of said random access memory;

a queue state data sequence counter responsive to the received queue state data for determining the addresses in which the data is stored; and a flip-flop which, during a transmission cycle, enables said transmission means and which, during a receive cycle, enables said receiver means.

4. The access protocol circuit of claim 1, wherein said processing means is a microcomputer.

5. The access protocol circuit of claim 4, wherein said microcomputer is programmed to implement a star network delay queue management algorithm.

* * * * *